(12) United States Patent
Tanabe et al.

(10) Patent No.: US 6,589,110 B2
(45) Date of Patent: Jul. 8, 2003

(54) AIR CONDITIONER OUTLET VENT DEVICE

(75) Inventors: Tadashi Tanabe, Wako (JP); Tetsuji Fukushima, Wako (JP); Hiroshi Maeda, Wako (JP); Yutaka Nakanishi, Gunma (JP)

(73) Assignee: Moriroku Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/143,818

(22) Filed: May 14, 2002

(65) Prior Publication Data

US 2002/0178744 A1 Dec. 5, 2002

(30) Foreign Application Priority Data

May 15, 2001 (JP) ........................................ 2001-145264

(51) Int. Cl.⁷ ................................................. B60H 1/34
(52) U.S. Cl. ........................ 454/155; 454/315; 454/319
(58) Field of Search ................................ 454/155, 315, 454/319, 320

(56) References Cited

U.S. PATENT DOCUMENTS 4,699,322 A * 10/1987 Jobst ........................... 239/503
4,735,131 A * 4/1988 Matsuno ....................... 454/315
5,797,792 A * 8/1998 Kotoh et al. .................. 454/320

FOREIGN PATENT DOCUMENTS

JP 60-45115 3/1985

* cited by examiner

Primary Examiner—Harold Joyce
(74) Attorney, Agent, or Firm—Arent Fox Kintner Plotkin & Kahn, PLLC

(57) ABSTRACT

An air conditioner outlet vent device includes a housing having a blow-out hole at its front end; a plurality of fins which are supported in parallel in the blow-out hole and each of which is capable of pivoting about its axis, the axes being parallel to one another; a common link which extends in an arrangement direction of the fins and to which the fins are pivotably connected at their rear ends; a pair of outer fins disposed at opposite ends in the arrangement direction of the fins, the outer fins each integrally including a shield plate which protrudes toward one of a pair of sidewalls of the housing so as to define opposite ends of the blow-out hole. In this device, a distance between a support point of each of the outer fins in the housing and a linkage point of the outer fin to the link is set larger than a distance between a support point of each of the fins other than the outer fins and its linkage point to the link. Thus, it is possible to effectively prevent the directivity of an air blow-out direction from being detracted.

3 Claims, 6 Drawing Sheets

AIR CONDITIONER OUTLET VENT DEVICE

BACKGROUND OF THE INVENTION

1. Field of the Invention

The present invention relates to an air conditioner outlet vent device, which is suitably used in an automobile or the like, and particularly to an improvement in an air conditioner outlet vent device comprising a housing having a blow-out hole at its front end; a plurality of fins which are supported in parallel in the blow-out hole and each of which is capable of pivoting about its axis, the axes being parallel to one another; a common link which extends in an arrangement direction of the fins and to which the fins are pivotably connected at their rear ends; a pair of outer fins disposed at opposite ends in the arrangement direction of the fins, the outer fins each integrally including a shield plate which protrudes toward one of a pair of sidewalls of the housing so as to define opposite ends of the blow-out hole.

2. Description of the Related Art

An air conditioner outlet vent device is already known, for example, from Japanese Utility Model Application Laid-open No.60-45115. In this device, shield plates for inhibiting the flowing of air between sidewalls of a housing and outer fins are integrally provided on the outer fins to protrude toward the sidewalls, in order to prevent a reduction in directivity of a blow-out direction due to an influence of an air flow in a straight direction between the sidewalls of the housing and the outer fins, when all the fins are pivoted in unison to change the air blow-out direction from the straight direction to the right or left direction.

In this conventional device, however, air flows between the outer fin and a fin adjacent to the outer fin, collides with the sidewall of the housing, and changes its course to flow along the sidewall, whereby the directivity of a blow-out direction may be disturbed. More specifically, when all the fins are pivoted to be fixed in a rightward blow-out direction, air flowing between the outer fin located at the right end and the fin second from the right end changes its flowing direction to flow along the right sidewall, and interferes with the flow of air turned rightwards. When all the fins are pivoted to be fixed in a leftward blow-out direction, air flowing between the outer fin located at the left end and the fin second from the left end changes its flowing direction to flow along the left sidewall, and interferes with the flow of air turned leftwards. Thus, the directivity of the blow-ff direction is disturbed.

SUMMARY OF THE INVENTION

The present invention has been achieved with the above circumstances in view, and it is an object of the present invention to provide an air conditioner outlet vent device, wherein the directivity of an air blow-out direction can be prevented from being detracted.

To achieve the above object, according to a first aspect and feature of the present invention, there is provided an air conditioner outlet vent device comprising a housing having a blow-out hole at its front end; a plurality of fins which are supported in parallel in the blow-out hole and each of which is capable of pivoting about its axis, the axes being parallel to one another; a common link which extends in an arrangement direction of the fins and to which the fins are pivotably connected at their rear ends; a pair of outer fins disposed at opposite ends in the arrangement direction of the fins, the outer fins each integrally including a shield plate which protrudes toward one of a pair of sidewalls of the housing so as to define opposite ends of the blow-out hole; wherein a distance between a support point of each of the outer fins in the housing and a linkage point of the outer fin to the link is set larger than a distance between a support point of each of the fins other than the outer fins and its linkage point to the link.

With this arrangement of the first feature, since the distance between the support point of each of the outer fins in the housing and the linkage point of the outer fin to the link is set larger than the distance between the support point of each of the fins other than the outer fins and its linkage point to the link, when all the fins are pivoted in unison, the pivoting angle of the outermost fin is suppressed to be smaller than the pivoting angle of the other fins. Also, since the distance between the outermost fin in the pivoting direction of the fins and the fin adjacent to the outermost fin is reduced, the amount of air colliding with the sidewall is suppressed to be small. In addition, since the shield plates are integrally provided on the outer fins to protrude toward the sidewalls of the housing, the amount of air flowing in a straight direction along the sidewalls is suppressed effectively, whereby the directivity of the air blow-out direction can be prevented effectively from being detracted.

According to a second feature of the present invention, in addition to the arrangement of the first feature, the outer fin comprises a rear fin portion which extends in parallel to the fins other than the outer fins when in an orientation to guide air in a straight direction from the blow-out hole and which is connected to the link, and a front fin portion which is inclined toward the fin adjacent to the outer fin and which is connected at an angle to a front end of the rear fin portion. With this arrangement, the distance between the outermost fin in the pivoting direction of the fins and the fin adjacent to the outermost fin is further reduced and hence, the amount of air colliding with the sidewall can be suppressed effectively to be small.

Further, according to a third feature of the present invention, in addition to the arrangement of the first or second feature, the outer fins are connected to the link while being capable of moving in a limited range in a direction along the arrangement direction of the fins and in a longitudinal direction of the housing. With this arrangement, even if the pivoting radius of the outermost fins and the pivoting radius of the other fins are different from each other due to the difference in distance between the support point and the linkage point, it is possible to prevent an excessive load acting on the link, and to provide the smooth movement of the link along the direction of arrangement of the fins.

BRIEF DESCRIPTION OF THE DRAWINGS

FIG. 1 is an exploded perspective view of an air conditioner outlet vent device;

FIG. 2 is a cross-sectional view of the air conditioner outlet vent device, taken along line 2—2 in FIG. 3;

FIG. 3 is a vertical sectional view taken along line 3—3 in FIG. 2;

FIG. 4 is a cross-sectional view taken along line 4—4 in FIG. 3;

FIG. 5 is a cross-sectional view similar to FIG. 2, but showing a state in which the blow-out direction has been changed from that shown in FIG. 2.

DESCRIPTION OF THE PREFERRED EMBODIMENTS

Figure 1:
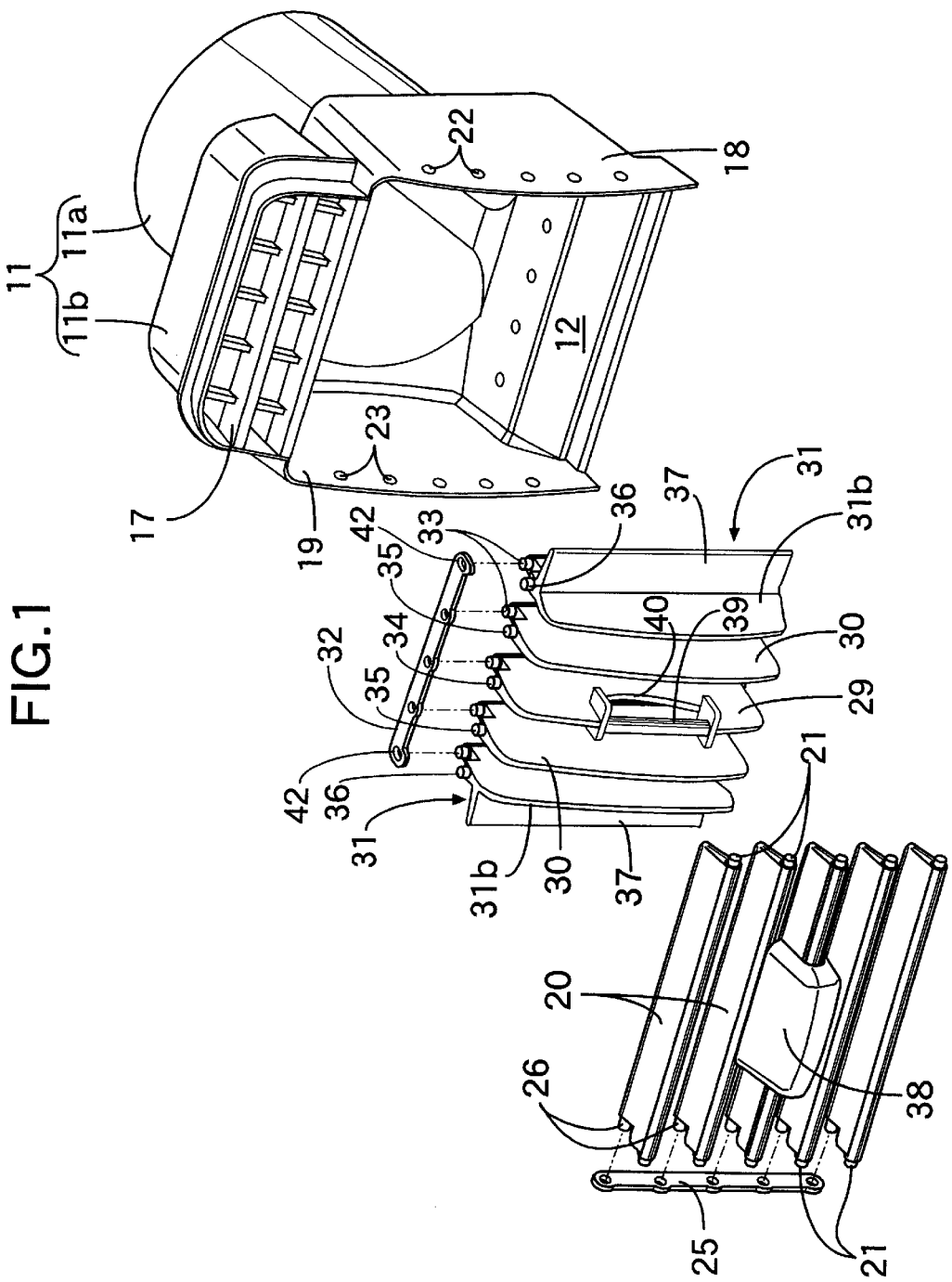
FIGS. 1 to 5 show a first embodiment of the present invention.
Figure 2:
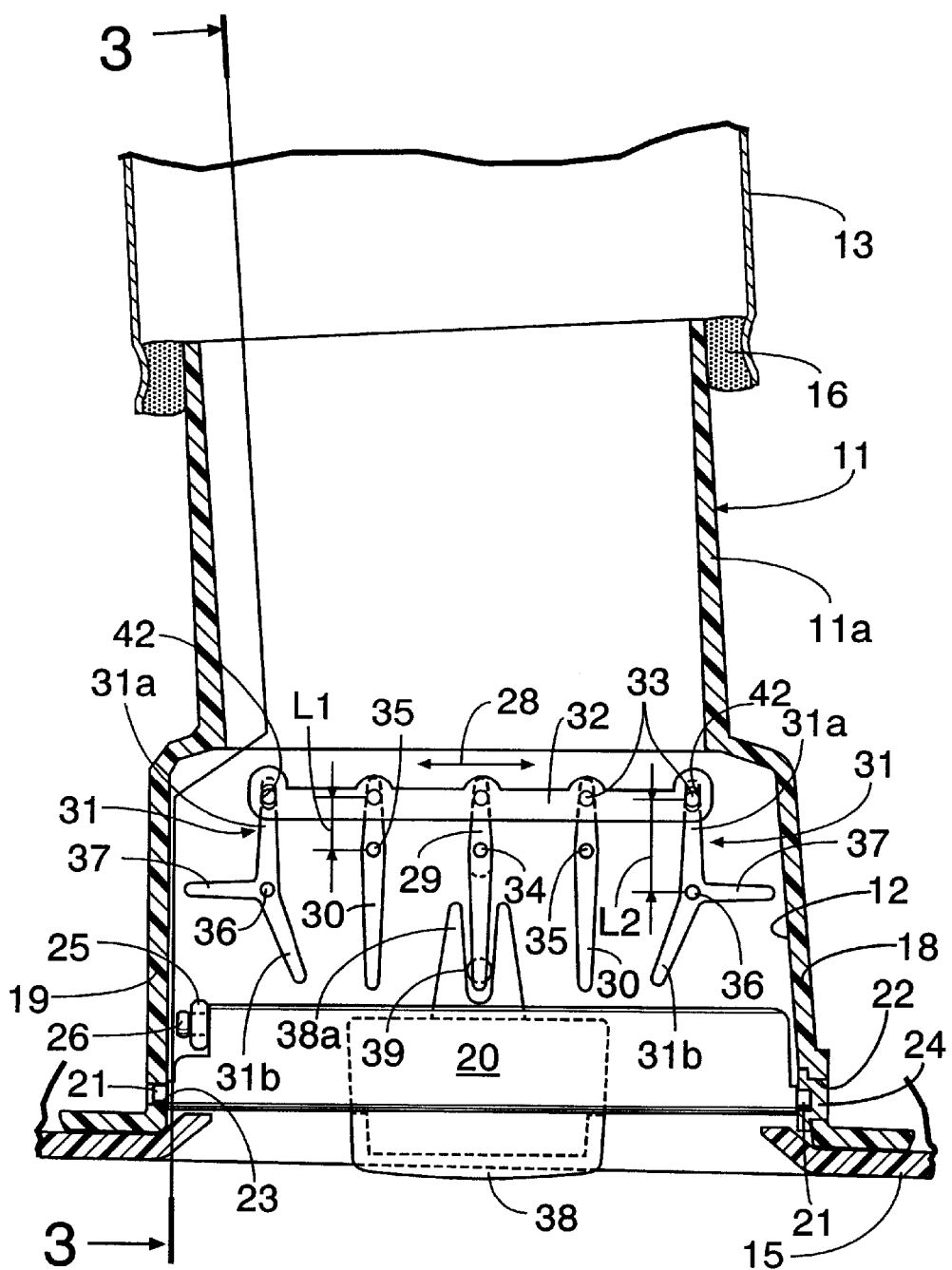
Figure 3:
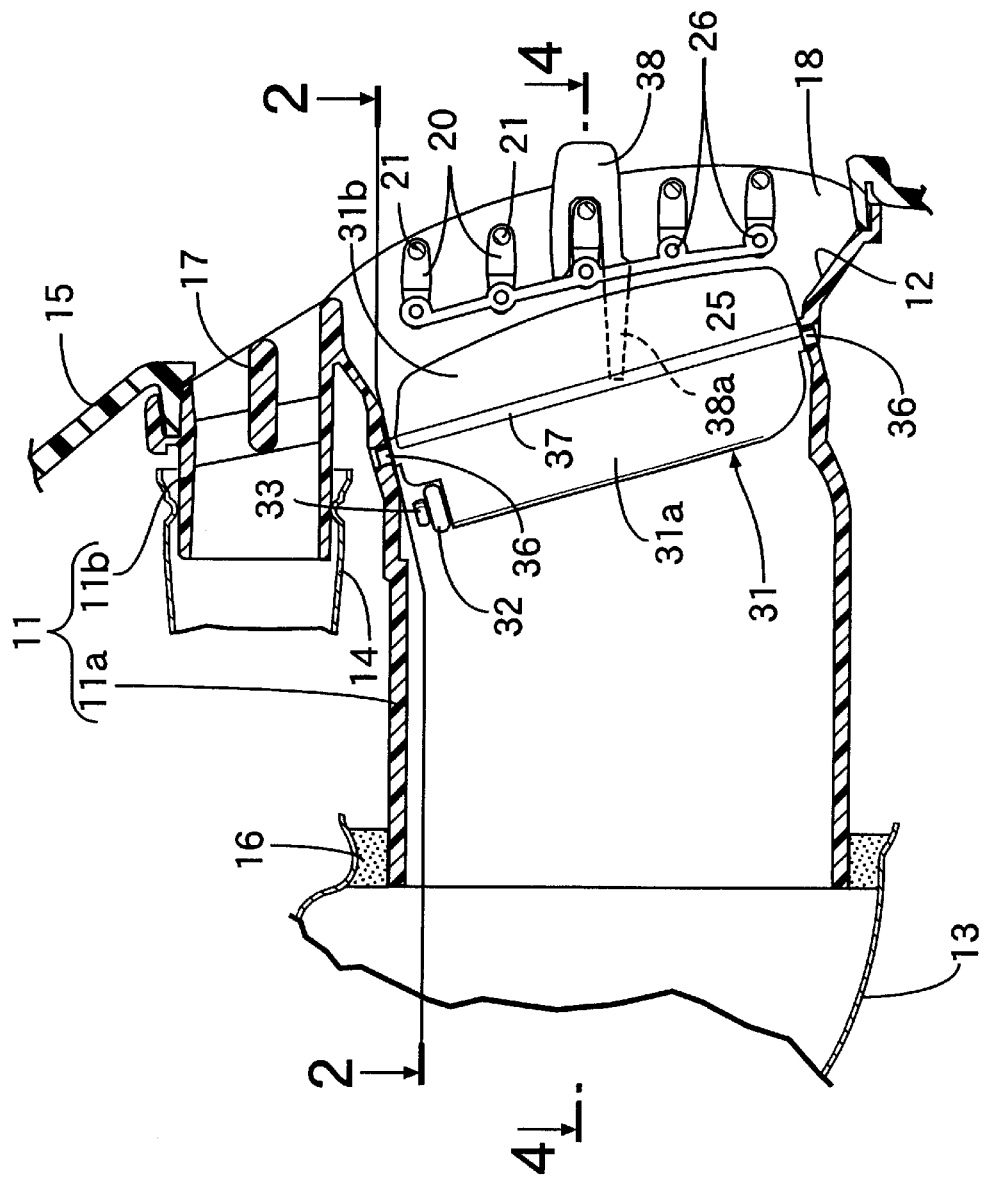

A first embodiment of the present invention will now be described with reference to FIGS. 1 to 5. Referring first to FIGS. 1 to 3, an air conditioner outlet vent device includes a synthetic resin housing 11 mounted on an instrument panel 15 in an automobile, for example, at a location on the side of a driver's seat. The housing 11 includes a main housing section 11a which is formed into a longitudinally extending tubular shape which opens at its front end to form a blow-out hole 12 and opens at its rear end, and a tubular section 11b formed into a rectangular tubular shape longitudinally shorter than the main housing section 11a and connected integrally to an upper portion of the front end of the main housing portion 11a.

The housing 11 is mounted on the instrument panel 15 in such a manner that the rear end of the main housing section 11a is fitted into and connected to an air blast duct 13 of an air conditioner, and that the rear end of the tubular section 11b is fitted into and connected to a duct 14 for guiding defogging air. An endless seal member 16 is mounted to an outer periphery of the rear end of the main housing portion 11a to come into resilient contact with an inner surface of the air blast duct 13. An air-guiding grid 17 is integrally provided at a front portion of the tubular section 11b, and guides the defogging air from the duct 14 toward a side window pane located on the driver's seat side.

The main housing section 11a includes a pair of sidewalls 18 and 19 at its front end so as to define opposite ends of the blow-out hole 12. A plurality of, e.g., five fins 20 are vertically disposed in the blow-out hole 12 and pivotably carried on the sidewalls 18 and 19. Each of the fins 20 is integrally provided at its opposite left and right ends with shaft portions 21. One of the left and right shaft portions 21 is pivotably carried in a bush 24 mounted in a support bore 22 provided in the sidewall 18 of the two sidewalls 18 and 19, and the other of the left and right shaft portions 21 is rotatably fitted into a shaft bore 23 provided in the other sidewall 19.

A vertically extending link 25 is disposed between the sidewall 19 and the fins 20 in the rear of the shaft portions 21, and connecting shaft portions 26 projectingly provided on the fins 20 in the rear of the shaft portions 21 and each having an axis parallel to the shaft portions 21 are connected commonly and rotatably to the link 25. Therefore, all the fins 20 are pivoted in unison in association with one another by operating one of the fins 20.

Figure 4:
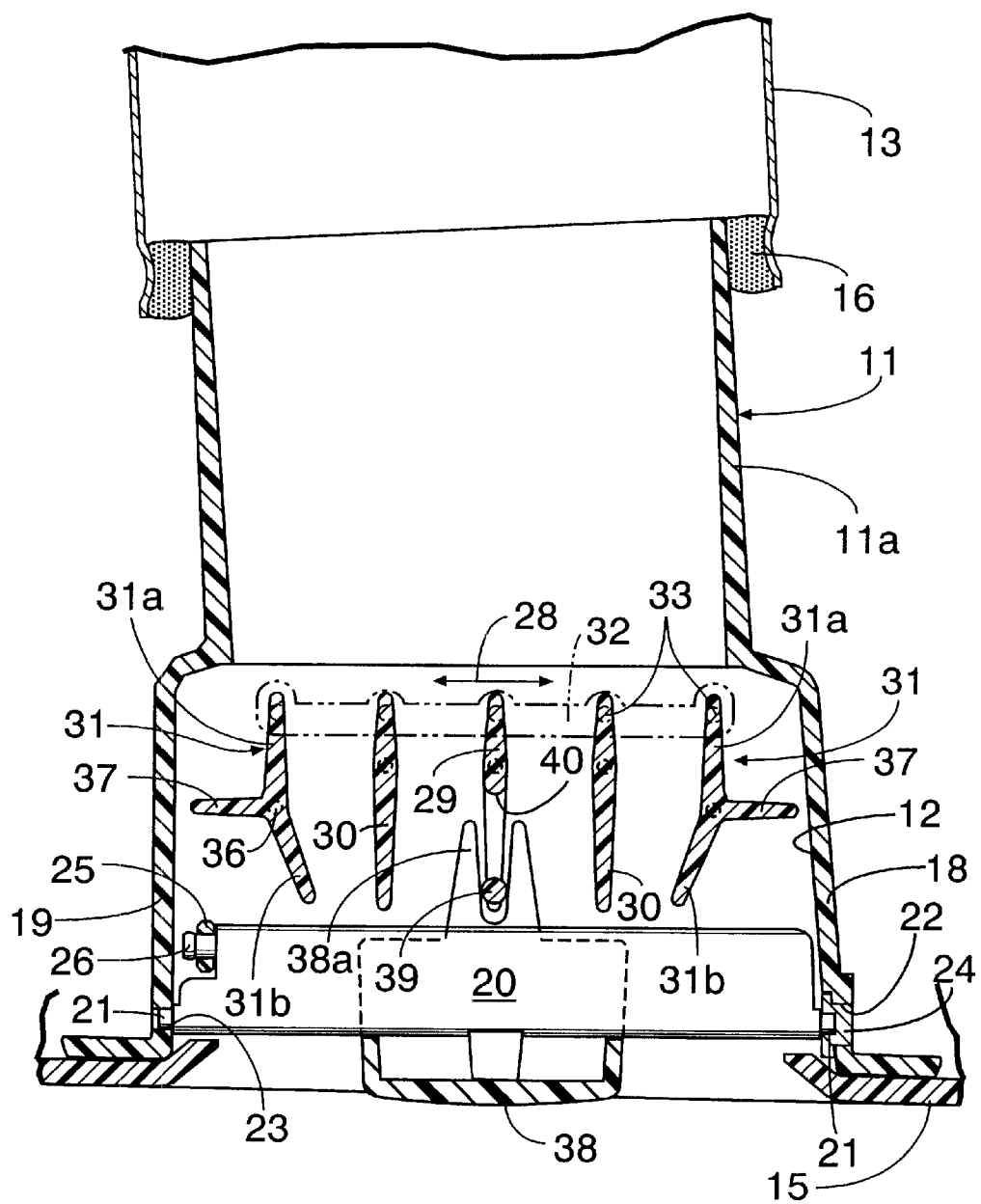

Referring also to FIG. 4, the following fins are disposed in parallel in an arrangement direction 28 established laterally in the blow-out hole 12 in the rear of the fins 20: a central fin 29 disposed centrally in the arrangement direction 28; a pair of intermediate fins 30, 30 located on opposite sides of the central fin 29; and a pair of outer fins 31, 31 disposed at the opposite ends in the arrangement direction 28 in such a manner that the intermediate fins 30, 30 are sandwiched between the outer fins 31, 31 and the central fin 29, respectively.

The central fin 29, the intermediate fins 30, 30 and the outer fins 31, 31 are formed to vertically extend and pivotably supported at their upper and lower ends on upper and lower walls of the main housing section 11a, respectively. Moreover, a link 32 is disposed between rear ends of the fins 29, 30, 31 and the upper wall of the main housing section 11a, and extends in parallel to the arrangement direction 28, and the fins 29, 30 and 31 are connected pivotably and commonly to the link 32 at their rear ends.

Each of the central fin 29 and the intermediate fins 30, 30 is formed to have a cross-section such that they extend in parallel to one another and longitudinally in a substantially one straight line. Each of the outer fins 31, 31 is formed to have a cross-section such that it comprises a rear fin portion 31a, 31a which extends in parallel to the central fin 29 and the intermediate fins 30, 30, when it is in an orientation to guide air in a straight direction from the blow-out hole 12; and a front fin portion 31b, 31b inclined toward the intermediate fins 30, 30 adjacent to the outer fins 31, 31 and connected at an angle to the front end of the rear fin portion 31a, 31a.

Connecting shaft portions 33 are integrally provided at upper portions of the rear ends of the central fin 29 and the intermediate fins 30, 30, and at upper portions of the rear ends of the rear fin portions 31a, 31a of the outer fins 31, 31, and protrude upwards. The connecting shaft portions 33 are connected commonly and rotatably to the link 32.

Moreover, the connecting shaft portions 33, 33 at the upper portions of the rear ends of the outer fins 31, 31 are inserted into elongated bores 42, 42 provided in opposite ends of the link 31. Thus, the outer fins 31, 31 are connected to the link 32, while being capable of moving in a limited range in a direction along the arrangement direction 28 of the fins 29, 30, 30, 31, 31 and in a longitudinal direction of the housing 11, i.e., in lateral and longitudinal directions.

Shaft portions 34 and 35 are provided integrally and projectingly at opposite upper and lower ends of the central fin 29 and the intermediate fins 30, 30, being spaced forwards with a distance L1 from the connecting shaft portions 33, 33, respectively. The shaft portions 34 and 35 are rotatably fitted into the upper and lower walls of the main housing section 11a, respectively. Shaft portions 36 are provided integrally and projectingly at opposite upper and lower ends of the outer fins 31, 31, being spaced forwards with a distance L2 from the connecting shaft portions 33 (at a connection between the rear fin portion 31a and the front fin portion 31b in the present embodiment). The shaft portions 36 are rotatably fitted into the upper and lower walls of the main housing section 11a, respectively.

The distances L1 and L2 are set so that a relation, L1<L2 is established, i.e., so that the distance L2 between support points of the outer fins 31, 31 in the housing 11 and linkage points of the outer fins 31, 31 to the link 32 is larger than the distance L1 between support points of the central fin 29 and the intermediate fins 30, 30 in the housing 11 and linkage points of the central fin 29 and the intermediate fins 30, 30 to the link 32.

Shield plates 37, 37 are integrally provided on the outer fins 31, 31, protrudes toward the pair of sidewalls 18 and 19 of the housing 11 so as to define opposite ends of the blow-out hole 12. Therefore, the flowing of air between the sidewalls 18 and 19 and the outer fins 31, 31 is inhibited by the shield plates 37, 37.

A control knob 38 is mounted on one of the plurality of fins 21 arranged vertically, e.g., on the vertically central fin 21 in the present embodiment, and enables sliding movement in a lateral direction. On the other hand, the central fin 29 is provided with a locking shaft 39 for engaging the central fin 29 with a bifurcated engagement portion 38a provided in the rear of the central fin 29, and a notch 40 for permitting the pivoting of the engage portion 38a about an axis of the locking shaft 39. Thus, the central fin 29 is pivoted by sliding the control knob 38, whereby the central fin 29, the intermediate fins 30, 30 and the outer fins 31, 31 connected commonly to the link 32 are pivoted, in unison, in association with one another.

The operation of the first embodiment will be described below with reference to FIG. 5. When the central fin 29, the intermediate fins 30, 30 and the outer fins 31, 31 are pivoted in unison, for example, rightwards in FIG. 5, and the pivoting angle α2 of the outer fins 31, 31 is suppressed to be smaller than the pivoting angle α1 of the other fins 29 and 30, 30, because the distance L2 between the support points of the outer fins 31, 31 in the housing 11 and the linkage points of the outer fins 31, 31 to the link 32 is larger than the distance L1 between the support points of the other fins 29 and 30, 30 in the housing 11 and the linkage points of the fins 29 and 30, 30 to the link 32.

Figure 5:
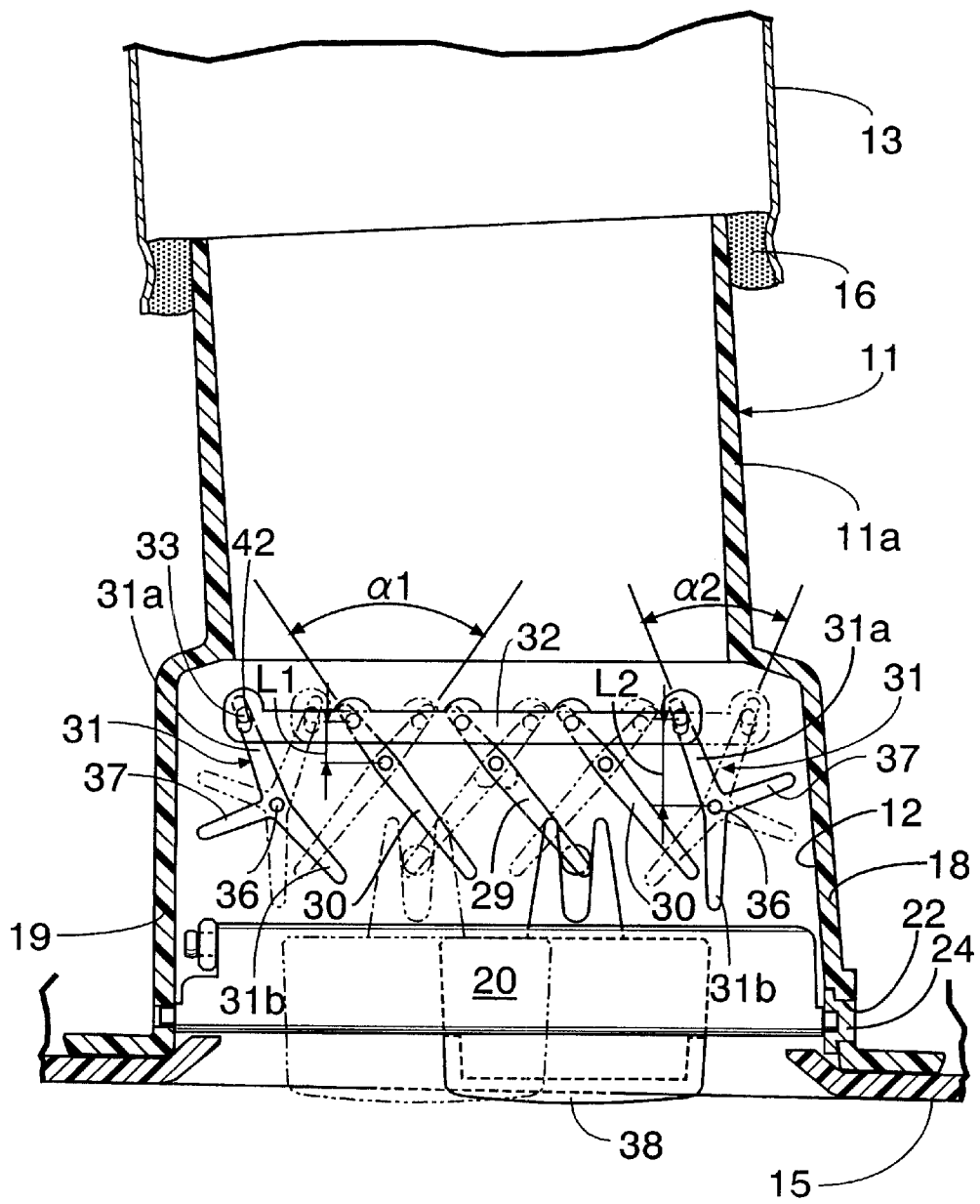

Therefore, the distance between the outer fin 31 located in a rightmost position in FIG. 5 and the intermediate fin 30 adjacent to the outer fin 31 is reduced, whereby the amount of air flowing from between the outer fin 31 and the intermediate fin 30 toward the sidewall 18 is decreased and thus, the amount of air colliding with the sidewall 18 is suppressed to a small value. In addition, since the outer fin 31 is integrally provided with the shield plate 37 protruding toward the sidewall 18, the amount of air flowing in the straight direction along the sidewall 18 is suppressed effectively, whereby the directivity of an air blow-out direction can be prevented effectively from being detracted.

Moreover, the outer fin 31 comprises the rear fin portion 31a which extends in parallel to the central fin 29 and the intermediate fins 30, 30 when it is in the orientation to guide the air in the straight direction from the blow-out hole 12 and which is connected to the link 32, and the front fin portion 31b inclined toward the intermediate fin 30 and connected at the angle to the front end of the rear fin portion 31a. With this arrangement, the distance between the outer fin 31 located in the rightmost position in FIG. 5 and the intermediate fin 30 adjacent to the outer fin 31 is further reduced. Thus, the amount of air colliding with the sidewall 18 can be reduced effectively to a small value.

As a result, even when the central fin 29, the intermediate fins 30, 30 and the outer fins 31, 31 must be disposed deeply with a relatively large distance from the front end edge of the blow-out hole 12, a reduction in air dispensing performance can be avoided, and the degree of freedom for the design can be increased.

Additionally, the outer fins 31 are connected to the link 32 for movement in the limited range in the direction along the arrangement direction 28 and in the longitudinal direction of the housing 11. Therefore, even if the pivoting radius of the outer fins 31, 31 and the pivoting radius of the other fins 29 and 30, 30 are different from each other due to the difference in distance between the support point and the linkage point, when the link 32 is moved in the direction along the arrangement direction 28, it can be avoided that an excessive load acts on the link 32, and the smooth movement of the link 32 in the direction along the arrangement direction 28 can be achieved.

Figure 6:
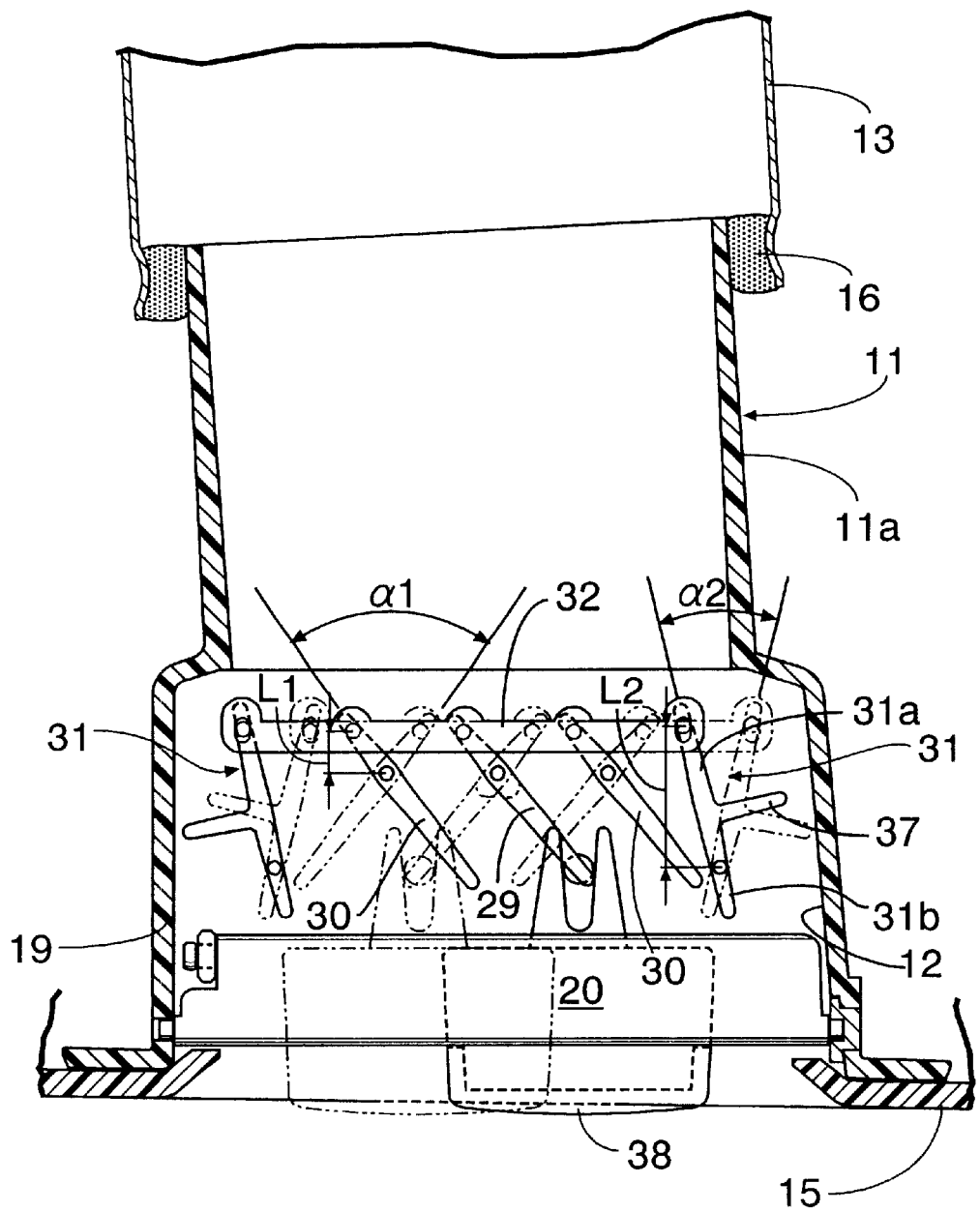
FIG. 6 is a cross-sectional view similar to FIG. 5, but showing a second embodiment.

In the first embodiment, the shaft portion 36 for supporting the outer fin 31 in the housing 11 is projectingly provided at a bent portion of the outer fin 31, namely, at the connection between the rear fin portion 31a and the front fin portion 31b, but as in a second embodiment shown in FIG. 6. However, as in the second embodiment shown in FIG. 6, the shaft portion 36 maybe projectingly provided at the front fin portion 31b in such a manner that the distance L2 between the support point of the outer fin 31 in the housing 11 and the linkage point of the outer fin 31 to the link 32 is larger than that in the first embodiment.

With the second embodiment, when the central fin 29, the intermediate fins 30, 30 and the outer fins 31, 31 are pivoted in unison, the pivoting angle α2 of the outer fins 31, 31 can be further decreased, thereby further effectively preventing a reduction in directivity of the air blow-out direction.

Although the embodiments of the present invention have been described in detail, it will be understood that the present invention is not limited to the above-described embodiments, and various modifications in design may be made without departing from the spirit and scope of the invention defined in the claims.

What is claimed is:

1. An air conditioner outlet vent device comprising:

a housing having a blow-out hole at its front end;

a plurality of fins which are supported in parallel in the blow-out hole and each of which is capable of pivoting about its axis, the axes being parallel to one another;

a common link which extends in an arrangement direction of the fins and to which the fins are pivotably connected at their rear ends;

a pair of outer fins disposed at opposite ends in the arrangement direction of the fins, the outer fins each integrally including a shield plate which protrudes toward one of a pair of sidewalls of the housing so as to define opposite ends of the blow-out hole;

wherein a distance between a support point of each of the outer fins in the housing and a linkage point of the outer fin to the link is set larger than a distance between a support point of each of the fins other than the outer fins and its linkage point to the link.

2. An air conditioner outlet vent device according to claim 1, wherein the outer fin comprises a rear fin portion which extends in parallel to the fins other than the outer fins when in an orientation to guide air in a straight direction from the blow-out hole and which is connected to the link, and a front fin portion which is inclined toward the fin adjacent to the outer fin and which is connected at an angle to a front end of the rear fin portion.

3. An air conditioner outlet vent device according to claim 1 or 2, wherein the outer fins are connected to the link while being capable of moving in a limited range in a direction along the arrangement direction of the fins and in a longitudinal direction of the housing.

* * * * *